(No Model.)
J. STOATE.
CULTIVATOR AND HARROW.
No. 410,615. Patented Sept. 10, 1889.
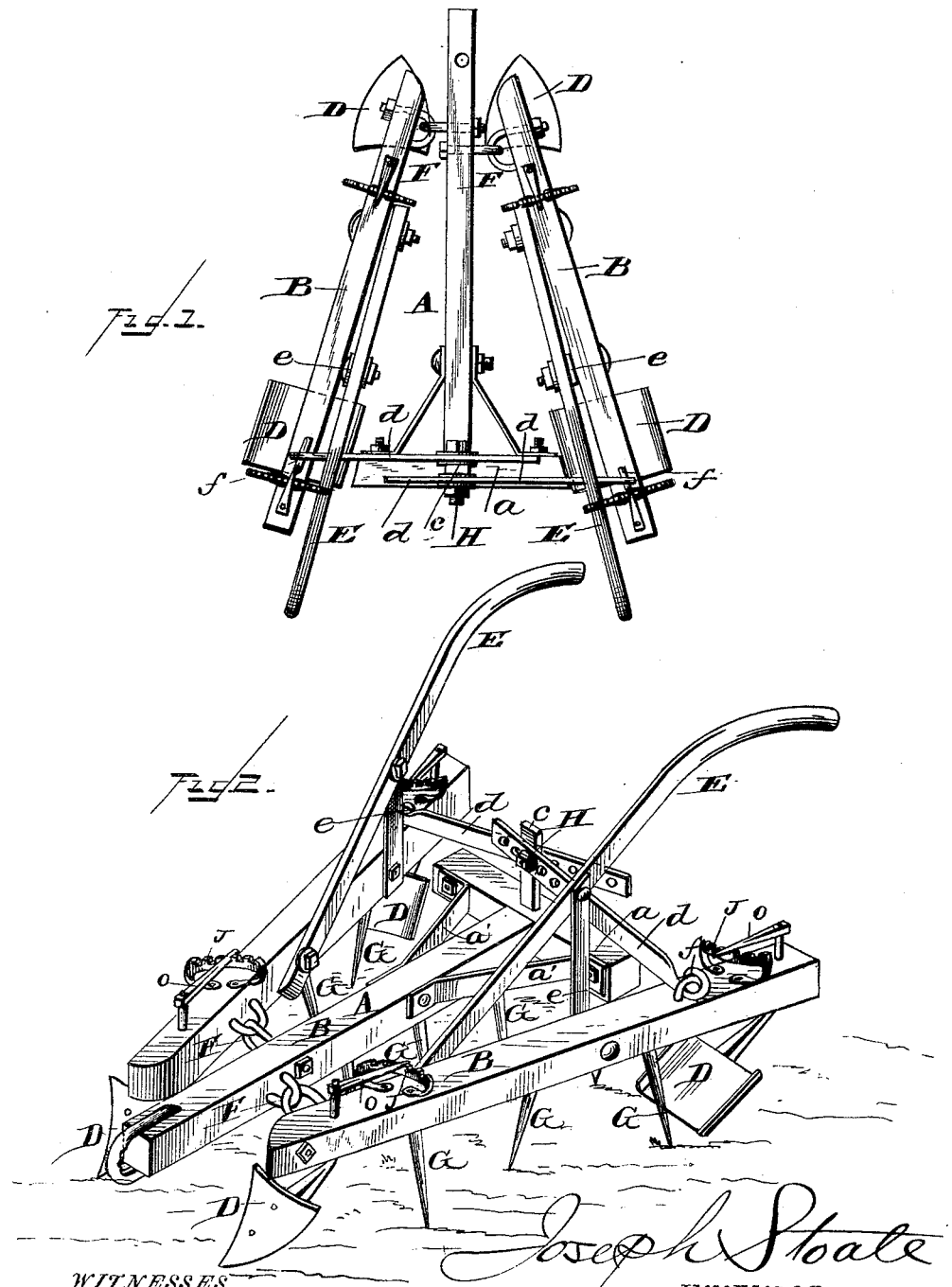
WITNESSES
F. L. Durand
Cary S. Ivy
INVENTOR
Joseph Stoate
By W. T. Fitzgerald
Attorney

UNITED STATES PATENT OFFICE.

JOSEPH STOATE, OF OXFORD, MISSISSIPPI.

CULTIVATOR AND HARROW.

SPECIFICATION forming part of Letters Patent No. 410,615, dated September 10, 1889.

Application filed June 10, 1889. Serial No. 313,799. (No model.)

*To all whom it may concern:*

Be it known that I, JOSEPH STOATE, a citizen of the United States, residing at Oxford, in the county of Lafayette and State of Mississippi, have invented certain new and useful Improvements in a Combined Cultivator and Harrow; and I do hereby declare the following to be a full, clear, and exact description of the invention, such as will enable others skilled in the art to which it appertains to make and use the same.

My invention relates to improvements in a combined harrow and cultivator, the object of which is to finely pulverize the soil and leave it in a condition for forming a seed-bed for small grain of various kinds, and it may also be used for cultivating growing crops and destroying the growth of weeds, &c.; and it consists of certain novel features, hereinafter described and claimed, reference being had to the accompanying drawings, which are to be considered part of this application, in which similar letters of reference denote corresponding parts in both the views.

Figure 1 is a top view, while Fig. 2 is a perspective front view.

Referring to the various parts of my invention, I provide a frame consisting of the center beam A, to the rear end of which I attach at right angles the end piece $a$. Springing from the under sides of these two parts of the frame are arranged at suitable distance from each other the inwardly-inclined teeth G.

Projecting from each side of the front end of center beam A are eyebolts F, which are intended to engage with similar bolts on the inner side of the front end of the side beams B B, and in such a manner pivotally connect these various parts forming the frame of my cultivator and harrow.

From the upper side of the end piece $a$ extends the adjusting-standard $c$, provided with a hole, the object of which will be hereinafter referred to.

On the upper sides of the rear ends of outward pieces B B are placed eyebolts $f f$, which are intended to engage with loops formed on the outer end of adjusting-levers $d$ $d$, the inner ends of which are provided with a series of holes for the purpose of receiving bolt A, arranged in the upright standard $c$. The side beams B B are also provided with a series of rearwardly-inclined teeth G G, and further provided at their rear and front ends with adjustable shovels or blades D D. These shovels or blades are attached to the frame by means of suitably-provided journals and journal-boxes, such journals passing entirely through the frame and extending above sufficiently to provide a means for attaching the adjustable levers O O, the free ends of which levers resting in suitably-provided ratchets J J.

Attached to the inner sides of the side beams B B are handles E E, suitably connected and additionally secured by uprights $e$ $e$.

It will thus be seen that I have provided a pivotally-connected frame which permits the independent movement of the inner and outer parts of such frames, the object of which is to enable the harrow and cultivator to readily conform to the varying conditions of the surface of the ground.

It will further be observed that I have provided for the ready and easy adjustment of the width of my improved harrow, as such a feature is very desirable in cultivating rows of growing crops of varying widths.

In operation the bolt H can be withdrawn and the harrow widened at its rear end to any preferred width, when the adjusting-levers upon each side of the adjusting-bar $c$ are so arranged that the holes provided therein will coincide with the hole in the standard $c$, when the bolt H may be inserted and secured.

The shovels or blades D may also be adjusted at varying angles by means of levers O O and ratchets J J, as will be readily understood.

The transversely-arranged piece $a$ on the rear of center beam $a$ is additionally secured and braced by means of braces $a'$.

Having described my invention, what I claim, and desire to secure by Letters Patent, is—

The pivotally-connected yielding frame for harrows and cultivators, consisting of the center beam A, to the rear end of which is secured the transverse end piece $a$ by braces $a'$ $a'$, the side beams B B, the front ends of which are pivotally connected to the front end of the center beam A, while their rear ends are inclined outwardly and adjustably secured to the standard $c$ on the end piece $a$ by means of inwardly-reaching levers $d$ $d$, while to each end of beams B B are attached the shovels D D, and the levers O O and ratchets J J, for controlling such shovels, as set forth.

In testimony whereof I affix my signature in presence of two witnesses.

JOSEPH STOATE.

Witnesses:
F. S. LEAVELL,
S. L. RIVERS.